H. Cunningham,

Grindstone.

No. 95,778.   Patented Oct. 12, 1869.

Witnesses:
Alex Selkirk
Chas. Selkirk

Inventor:
Henry Cunningham

United States Patent Office.

HENRY CUNNINGHAM, OF ALBANY, NEW YORK.

Letters Patent No. 95,778, dated October 12, 1869.

IMPROVEMENT IN GRINDING CURRIERS' KNIVES.

The Schedule referred to in these Letters Patent and making part of the same.

*To all whom it may concern:*

Be it known that I, HENRY CUNNINGHAM, of the city and county of Albany, State of New York, have invented certain new and useful Improvements in the Mode of Constructing and Operating Grindstones for Sharpening Curriers' Knives; and I do hereby declare that the following is a full, clear, and exact description thereof, reference being had to the accompanying drawings, making a part of this specification, in which—

It is desirable and necessary, in sharpening curriers' knives, to preserve their edge slightly higher in their centres than at their ends, and the usual mode of sharpening those knives has been by working by hand the said knives on the flattened end of a curriers' stone, in a manner not unlike that of sharpening a tool on an oil-stone.

By my invention, the usual end-face is made to revolve horizontally, and, running thus, the outer periphery of the stone, carrying a greater grinding-surface than the portions at or near the centre, cuts or grinds away the knife faster at its end than at the centre.

The nature of my invention consists in a suitable disk, provided with slots and dogs, or with ears or lugs, and set-bolts, by which the stone is fixed to the said disk.

The said disk is made with or keyed fast to an upright shaft, and provided with a suitable band-pulley, by which the stone is driven.

The lower end of the shaft stands and works in a thimble, and the whole is placed in a high tub, or in a barrel.

When run with a belt, the belt used should be rubber, which would not be affected by the water.

I would also prefer to have the vessel in which the shaft stands, to rise up a little higher than the top of the stone, so that the water, thrown by centrifugal force from the stone, would not be thrown on the person operating.

To enable others skilled in the art to make and use my invention, I will proceed to describe it, in reference to the drawings, and the letters of reference marked thereon, the same letters indicating like parts.

Figure 1:
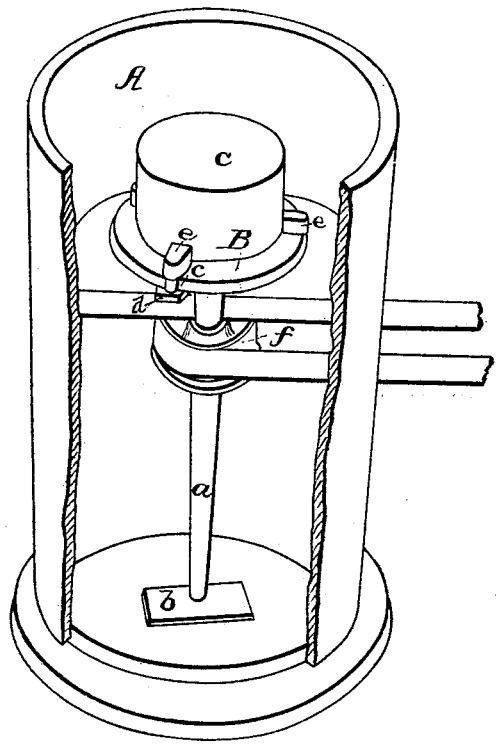
Figure 1 represents the invention, with a part of its tub broken away.
Figure 2:
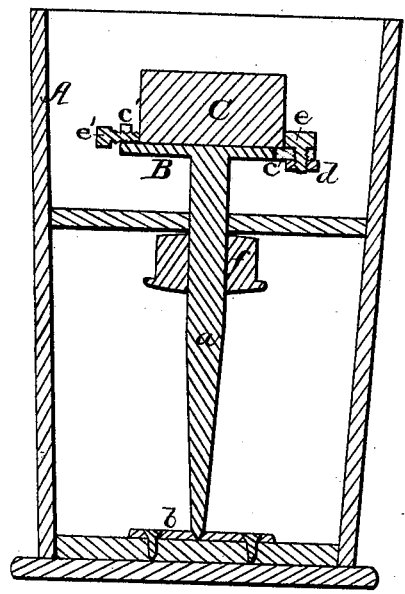
Figure 2 is a vertical section of the invention.
Figure 3:
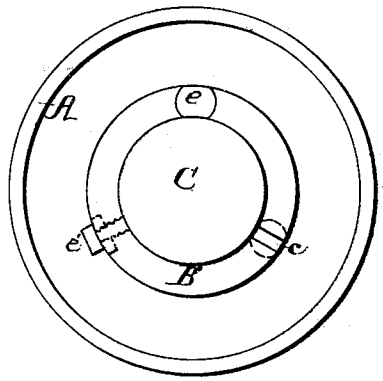
Figure 3 is a vertical view from above of disk-stone, and manner of attachment of one to the other.

A, figs. 1, 2, and 3, represents a tub, or any suitable vessel, to contain the operating-parts of this invention, which consists in a vertical shaft, *a*, standing in the thimble *b* in the bottom of the vessel.

B is a suitable disk, made with or keyed to the shaft *a*, at its top, as shown in figs. 1 and 2.

The said disk is provided with slots *c*, figs. 2 and 3, in which work dogs *e*, tightened by screw-nuts *d*, or the disk may be provided with lugs *c'* and set-screws *e'*, either of which would secure the stone C to its place on the disk B equally as well.

The stone C, thus secured, may be driven by a band-pulley, *f*, if power be used, or may be operated by a crank and connecting-rod, operated by a bell-crank and treadle, from the outside, by the foot.

The tub A, rising above the top of the stone, will prevent the dripping water, used on the stone C, being thrown on the person operating with the stone.

Having described my invention,

What I claim, and desire to secure by Letters Patent, is—

The disk B, provided with the slots *c*, dogs *e*, or their equivalents, and the vertical shaft *a*, all in combination with the stone C, substantially as and for the purpose set forth.

HENRY CUNNINGHAM.

Witnesses:
ALEX. SELKIRK,
CHAS. SELKIRK.